United States Patent
Liu et al.

(10) Patent No.: US 10,080,242 B2
(45) Date of Patent: Sep. 18, 2018

(54) METHOD AND SYSTEM FOR ALLOCATING RANDOM ACCESS CHANNEL RESOURCE

(71) Applicant: ZTE CORPORATION, Shenzhen, Guangdong Province (CN)

(72) Inventors: Kun Liu, Shenzhen (CN); Bo Dai, Shenzhen (CN); Zhaohua Lu, Shezhen (CN); Shuqiang Xia, Shenzhen (CN); Huiying Fang, Shenzhen (CN); Jing Shi, Shenzhen (CN); Xincai Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 106 days.

(21) Appl. No.: 15/032,315

(22) PCT Filed: May 23, 2014

(86) PCT No.: PCT/CN2014/000524
§ 371 (c)(1),
(2) Date: Apr. 27, 2016

(87) PCT Pub. No.: WO2014/183474
PCT Pub. Date: Nov. 20, 2014

(65) Prior Publication Data
US 2016/0286580 A1    Sep. 29, 2016

(30) Foreign Application Priority Data

Nov. 1, 2013  (CN) .......................... 2013 1 0536005

(51) Int. Cl.
H04W 74/08     (2009.01)
H04W 74/00     (2009.01)
(Continued)

(52) U.S. Cl.
CPC .......... *H04W 74/0833* (2013.01); *H04L 5/003* (2013.01); *H04W 4/70* (2018.02); *H04W 74/006* (2013.01); *H04L 5/0053* (2013.01)

(58) Field of Classification Search
CPC . H04W 4/005; H04W 72/042; H04W 72/048; H04W 72/04; H04W 48/12;
(Continued)

(56) References Cited

U.S. PATENT DOCUMENTS

2012/0099543 A1  4/2012 Yang et al.
2013/0083749 A1  4/2013 Xu et al.
(Continued)

FOREIGN PATENT DOCUMENTS

CN   102271418 A   12/2011
CN   103220811 A   7/2013
CN   103260251 A   8/2013

*Primary Examiner* — Kwang B Yao
*Assistant Examiner* — Ricardo Castaneyra
(74) *Attorney, Agent, or Firm* — Ling Wu; Stephen Yang; Ling and Yang Intellectual Property

(57) ABSTRACT

Disclosed are a method and system for allocating random access channel resources, wherein the method includes the following steps: a first node sending random access channel configuration information through a downlink channel, wherein the information includes at least configuration information of a random access channel allocated to a second node. The present document relates to the field of mobile communication. The technical solution according to the embodiment of the present document is applicable to a machine type communication (MTC) system, thereby solving the problem of an MTC user equipment (UE) receiving a random access response message, and achieving a receiving configuration of the random access response message in an improvement design.

17 Claims, 4 Drawing Sheets

(51) Int. Cl.
*H04L 5/00* (2006.01)
*H04W 4/70* (2018.01)

(58) Field of Classification Search
CPC ........... H04W 74/0833; H04W 74/006; H04W 24/02; H04W 52/242; H04W 52/143; H04W 52/367; H04W 52/346; H04W 52/24; H04W 52/04; H04W 52/18; H04W 28/0215; H04W 88/02; H04W 4/70; H04L 5/003; H04L 5/0053
See application file for complete search history.

(56) References Cited

U.S. PATENT DOCUMENTS

| 2015/0237651 A1* | 8/2015 | Nobusawa | H04W 74/006 370/329 |
| 2015/0304080 A1* | 10/2015 | Yi | H04L 1/08 370/329 |

* cited by examiner

FIG. 6

| RA0 | | RA2 | | RA4 | | RA6 | | RA8 | |
| | RA1 | | RA3 | | RA5 | | RA7 | | |

Frame0, Frame0, Frame0, Frame0, Frame0, Frame1, Frame1, Frame1, Frame1,
Subframe0 Subframe2 Subframe4 Subframe6 Subframe8 Subframe0 Subframe2 Subframe4 Subframe6

FIG. 6

Frame0, Frame0, Frame0, Frame0, Frame0, Frame1, Frame1, Frame1, Frame1,
Subframe0 Subframe2 Subframe4 Subframe6 Subframe8 Subframe0 Subframe2 Subframe4 Subframe6 Subframe8

▨ Subset 0 for CIL0      ▦ Subset 1 for CIL1      ▥ Subset 2 for CIL2

FIG. 7

Frame0, Frame0, Frame0, Frame0, Frame0, Frame1, Frame1, Frame1, Frame1, Frame1,
Subframe0 Subframe2 Subframe4 Subframe6 Subframe8 Subframe0 Subframe2 Subframe4 Subframe6 Subframe8

▧ Subset 0 for CIL0      ▦ Subset 1 for CIL1      ▥ Subset 2 for CIL2

FIG. 8

Frame0, Frame0, Frame0, Frame0, Frame0, Frame1, Frame1, Frame1, Frame1, Frame1,
Subframe0 Subframe2 Subframe4 Subframe6 Subframe8 Subframe0 Subframe2 Subframe4 Subframe6 Subframe8

▥ Subset 0 for CIL0 &CIL1              ▦ Subset 1 for CIL2

FIG. 9

METHOD AND SYSTEM FOR ALLOCATING RANDOM ACCESS CHANNEL RESOURCE

TECHNICAL FIELD

The present document relates to the field of mobile communications, and more particularly, to a method and system for allocating a random access channel resource.

BACKGROUND OF THE RELATED ART

Machine type communication (MTC) User Equipment (hereinafter referred to as MTC UE), also known as Machine to Machine (M2M) user communication device, is the main application form at this stage of Internet of things. Low power consumption and low cost are important guarantees for its large scale of applications. Currently, the M2M devices deployed in the market are mainly based on the Global System of Mobile communication (GSM) system. In recent years, due to the increase of the spectrum efficiency of Long Term Evolution (LTE)/LTE-advanced (LTE-A), more and more mobile operators choose the LTE/LTE-A as the evolution direction of the future broadband wireless communication system. The LTE/LTE-A based M2M multiple types of data services will also be more attractive. Only when the cost of the LTE-M2M device is lower than the MTC terminal in the GSM system, the M2M services can be really transferred from the GSM to the LTE system.

Currently, main alternative methods for reducing the cost of the MTC user terminal include: reducing the number of receiving antennas of the terminal, reducing baseband processing bandwidth of the terminal, reducing the peak rate supported by the terminal, and using the half-duplex mode. However, the cost reduction means the performance degradation, while the LTE/LTE-A system cell coverage requirement cannot be reduced, therefore some measures should be taken in order to achieve the coverage performance requirements of existing LTE terminals when using MTC terminals with low-cost configuration. In addition, the MTC terminals may be located in locations such as basement and corner, the environment where it is located is worse than that of the general LTE UE. To compensate for the decreased coverage caused by the penetration loss, parts of MTC UEs need more performance improvements, therefore, for this scenario, the uplink and downlink coverage improvement of parts of MTC UEs is necessary. How to ensure the user's access quality is the first issue to be considered, and it is necessary to perform an improvement design for the Physical Random Access Channel (PRACH) in the LTE/LTE-A system to ensure that the MTC UE can normally access to the system.

The position information of physical resource blocks (PRBs) occupied by the random access response message (RAR) in the LTE/LTE-A system is included in the downlink control information (DCI) and sent through the physical downlink control channel (PDCCH). Furthermore, the abovementioned DCI information further includes a 16-bit Cyclic Redundancy Check (CRC for short), and the abovementioned CRC further uses a 16-bit random access radio network temporary identity (RA-RNTI) to be scrambled, and the scrambling method is:

$$c_k = (b_k + a_k) \bmod 2 \quad k=0,1,\ldots,15$$

Wherein $b_k$ is the $(k+1)^{th}$ bit in the CRC; $a_k$ is the $(k+1)^{th}$ bit in the RA-RNTI; $c_k$ is the $(k+1)^{th}$ bit generated after the scrambling.

The UE receives the RAR message and obtains the uplink time synchronization and uplink resources. However, at this time, the UE cannot determine that the RAR message is sent to itself rather than another UE, because there is possibility that different UEs send the same random access sequence on the same time-frequency resources, and they will receive the same RAR through the same RA-RNTI. Furthermore, the UE also does not know whether there are other UEs using the same resources to access randomly. To this end, the UE needs to use the subsequent Msg3 and Msg4 messages to resolve such random access contention.

The Msg3 is the first message transmitted in the PUSCH based on the uplink scheduling and by using the HARQ (Hybrid Automatic Repeat request) mechanism. In the initial random access process, what is be sent in the Msg3 is the RRC layer connection request message (RRCConnectionRequest). If different UEs receive the same RAR message, they will obtain the same uplink resources and send the Msg3 message at the same time, and in order to distinguish different UEs, a specific UE ID will be carried in the MSG3 to distinguish different UEs. In the case of initial access, the ID may be the UE S-TMSI (if existing) or a randomly generated value of 40 bits.

After sending the MSg3 message, the UE will immediately start a contention elimination timer (the timer should be restarted at each subsequent Msg3 retransmission), and the UE needs to monitor the ContentionResolution message (Msg4 message) returned by the eNodeB to itself during this time.

Within the time configured by the contention elimination timer, the UE receives the Msg4 message returned by the eNodeB, and the UE ID carried therein matches with the one reported to the eNodeB in the Msg3, then the UE thinks that it wins in this random access contention and the random access is successful, and sets a temporary C-RNTI obtained in the RAR message as its own C-RNTI. Otherwise, the UE believes that this access fails, and restarts the random access retransmission process.

Because an improvement design is performed on the Physical Random Access Channel (referred to as PRACH) in the LTE/LTE-A system to ensure that the MTC UE can normally access to the system, an improvement design also needs to be performed on the Msg2, the Msg3 and the Msg4 in the LTE/LTE-A system to ensure that the MTC UE can normally access to the system.

SUMMARY

The present document provides a method and system for allocating random access channel resources to solve the problem of an MTC UE receiving a random access response message.

A method for allocating random access channel resources includes:

a first node sending random access channel configuration information through a downlink channel, wherein the information includes at least configuration information of a random access channel allocated to a second node.

Preferably, the random access channel configuration information is configured by a system, or configured by the first node in System Information (SI) or downlink control information (DCI).

Preferably, the SI is sent in a physical downlink shared channel (PDSCH).

Preferably, the DCI is sent in a physical downlink control channel (PDCCH) or an enhanced physical downlink control channel (EPDCCH).

Preferably, the method further includes: dividing second nodes into one or more sets based on different coverage improvement targets that need to be supported, the second node(s) in each set corresponds to one coverage improvement level.

Preferably, the method further includes: the system configuring or the first node sending a number N of coverage improvement levels through a downlink channel to the second node.

Preferably, the coverage improvement level corresponds to a value range of one coverage improvement target.

Preferably, a maximum value of the coverage improvement target is configured by the system or sent by the first node through a downlink channel to the second node.

Preferably, a minimum value of the coverage improvement target is configured by the system or sent by the first node through a downlink channel to the second node.

Preferably, a value range of a coverage improvement target corresponding to each coverage improvement level is determined by the number of coverage improvement levels and the maximum value of the coverage improvement and in accordance with a predefined rules; or, a value range of the coverage improvement target corresponding to each coverage improvement level is determined by the number of coverage improvement levels, the maximum value of the coverage improvements and the minimum value of the coverage improvements and in accordance with the predefined rule.

Preferably, the predefined rule is any of the following:

a value range of a coverage improvement target corresponding to each coverage improvement level is equal and has no overlapping, and value ranges of all coverage improvement targets which are put together are the same as a range from a minimum value of coverage improvement targets to a maximum value of coverage improvement targets;

a value range of a coverage improvement target corresponding to each coverage improvement level is equal and has no overlapping, and value ranges of all coverage improvement targets which are put together are less than a range from a minimum value of coverage improvement targets to a maximum value of coverage improvement targets;

a value range of a coverage improvement target corresponding to each coverage improvement level has no overlapping, and a proportional relationship of a length of a value range of the coverage improvement target corresponding to each coverage improvement level is configured by the system or sent by the first node through a downlink channel to the second node, the value ranges of all the coverage improvement targets which are put together are the same as a range from a minimum value of coverage improvement targets to a maximum value of coverage improvement targets; and a value range of a coverage improvement target corresponding to each coverage improvement level has no overlapping, a proportional relationship of a length of a value range of a coverage improvement target corresponding to each coverage improvement levels is configured by the system or sent by the first node through a downlink channel to the second node, and the value ranges of all the coverage improvement targets which are put together are less than a value range from a minimum value of coverage improvement targets to a maximum value of coverage improvement targets.

Preferably, the method further includes:

configuring each coverage improvement level with a random access sequence, wherein a proportion of a number of the configured random access sequences includes one or more proportional relationships.

Preferably, the method further includes: the proportional relationship is configured by the system or sent by the first node through a downlink channel to the second node.

Preferably, the method further includes: through a coverage improvement level of the second node, indicating a number of retransmissions or a retransmission level of at least one of the following information: PDCCH indicating a random access response message of the second node; PDCCH indicating an RRC layer connection request message (RRCConnectionRequest) of the second node; PDCCH indicating a content resolution message (ContentionResolution) of the second node; a random access response message of the second node; an RRC layer connection request message of the second node; a contention resolution message of the second node.

Preferably, There exists a mapping relationship between the retransmission level of the information and the number of retransmissions of the information, and the number of retransmissions of the information is determined according to the retransmission level of the information.

Preferably, a number of repetitions of a random access response message of the second node is indicated in a PDCCH.

Preferably, a number of repetitions of an RRC layer connection request message of the second node is indicated in a PDCCH.

Preferably, information of the number of repetitions of the RRC layer connection request message of the second node is indicated in the random access response message of the second node.

Preferably, a number of repetitions of the contention resolution message of the second node is indicated in a PDCCH.

Preferably, information of the number of repetitions of the contention resolution message of the second node is indicated in the random access response message of the second node or indicated in the RRC layer connection request message of the second node.

Preferably, after the second node accesses to the system, a number of initial repetitions of a PDCCH of the second node is indicated by the coverage improvement level of the second node, or, the number of initial repetitions of the PDCCH of the second node is the same as a number of repetitions of the PDCCH indicating the random access response message of the second node, or, the number of initial repetitions of the PDCCH of the second node is the same as a number of repetitions of the PDCCH indicating the contention resolution message of the second node.

Preferably, time-frequency resources allocated to the random access channels of the second nodes of different coverage improvement levels are different.

Preferably, the first node allocates different time-frequency resources to the random access channels of the second nodes of different coverage improvement levels through time division multiplexing (TDM) and/or frequency division multiplexing (FDM).

Preferably, in a same period of time, when a plurality of sets of physical resource block (PRB) groups desired for sending random access sequences are configured in frequency domain resources, the first node can use the FDM to allocate different time-frequency resources to the random access channels of the second nodes of different coverage improvement levels.

Preferably, time-frequency resources allocated to the random access channels of the second nodes of the plurality of coverage improvement levels are the same.

Preferably, random access sequences allocated to the second nodes of the plurality of coverage improvement levels are different.

Preferably, in a same period of time, when a plurality of sets of physical resource block (PRB) groups desired for sending the random access sequences are configured in frequency domain resources, proportions of numbers of random access sequences allocated to the second nodes of each coverage improvement level in the plurality of coverage improvement levels are the same in each set of PRB group resources, or a proportional relationship of the numbers of random access sequences allocated to the second nodes of each coverage improvement level in the plurality of coverage improvement levels is configured by the system or sent by the first node through a downlink channel to the second node.

Preferably, the time-frequency resources are at least one of the following: a PRB, a PRB set, a subframe, and a subframe set.

Preferably, a format used by the second node for sending the random access sequences is configured by the system or sent by the first node through a downlink channel to the second node.

Preferably, the method further includes: the second node resending the random access sequence for M times according to the format, wherein a value of M is indicated by the coverage improvement level of the second node.

Preferably, the time-frequency resources of the random access channels occupied by the second node for resending the random access sequence for M times are determined according to a predefined rule, wherein the predefined rule is at least one of the following:

indexes of PRBs or PRB groups corresponding to the time-frequency resources of the random access channels occupied by the random access sequence of M times are the same, indexes of PRBs or PRB groups corresponding to the time-frequency resources of the random access channels occupied by the random access sequence of M times are different, frequency-domain positions corresponding to the time-frequency resources of the random access channels occupied by the random access sequence of M times are the same, frequency-domain positions corresponding to the time-frequency resources of the random access channels occupied by the random access sequence of M times are different, when only one set of physical resource block (PRB) groups desired for sending the random access sequence is configured in the frequency domain resources in a same period of time, indexes of the PRBs occupied for sending the random access sequence for two successive times are different, when only one set of physical resource block (PRB) groups desired for sending the random access sequence is configured in the frequency domain resources in a same period of time, frequency positions of the PRBs occupied for sending the random access sequence for two successive times are different, when a plurality of sets of physical resource block (PRB) groups desired for sending the random access sequence is configured in the frequency domain resources in a same period of time, different sets of PRB group resources are occupied for sending the random access sequence for two successive times, and rules for selecting PRB resources occupied for sending the random access sequence for two successive times are configured by the system.

Preferably, the random access channel information allocated to the second node further includes starting resource position information for the second node sending a random access sequence in the allocated random access channels, and the starting resource position information is at least one of the following:

information of a subframe where the starting resource is located, information of a frame where the starting resource is located, information of a physical resource block (PRB) where the starting resource is located, information of a physical resource block group (PRB group) where the starting resource is located, and information of a subcarrier where the starting resource is located.

Preferably, the method further includes: when initially accessing to the system, the second node selecting the coverage improvement level at a first time in accordance with the following rules:

the second node measuring a reference signal sent by the first node, and determining a coverage improvement level selected by the second node at the first time based on a measurement result and a mapping table of measurement results with the coverage improvement levels configured by the system.

Preferably, the measurement result is at least one of the following: reference signal receive power (RSRP), reference signal receive quality (RSRQ), received signal strength indicator (RSSI), path loss between the second node and the first node, received signal to noise ratio (SNR) of the downlink reference signal.

Preferably, the method further includes:

when initially accessing to the system, the second node selecting a minimum coverage improvement level configured by the system.

Preferably, the system configuring is specifically any one or more of the following: predefining with a standard; predefining with a network; configuring with a standard; configuring with a network; configuring with a network high layer.

Preferably, the first node is at least one of the following: Macrocell, Microcell, Picocell, Femtocell, low power node (LPN) and relay.

Preferably, the second node is at least one of the following:

one or more terminals; one or more terminal groups.

Preferably, the terminal is an MTC terminal and/or an MTC coverage improvement terminal.

The present document further provides a system for allocating random access channel resources including a first node and a second node;

the first node is configured to: send random access channel configuration information through a downlink channel, and the information includes at least random access channel information allocated to the second node.

The embodiment of the present document provides a method and system for allocating random access channel resources, and the first node sends random access channel configuration information through a downlink channel, the random access channel configuration information includes at least random access channel resource information allocated to a third node, the random access channel configuration information is configured by the system or configured by the first node in the SI or the DCI, thus achieving receiving configuration for a random access response message in an improvement design, and solving the problem of an MTC UE receiving a random access response message.

BRIEF DESCRIPTION OF THE DRAWINGS

FIG. 6 is a schematic diagram of an RA arrangement after renumbering the time-frequency resources of the random access channels in accordance with the fourth, fifth, sixth and seventh embodiments of the present document;

FIG. 7 is a schematic diagram of an arrangement after renumbering the time-frequency resources of the random access channels in accordance with the fifth embodiment of the present document;

FIG. 8 is a schematic diagram of the arrangement after renumbering the time-frequency resources of the random access channels in accordance with the sixth embodiment of the present document;

FIG. 9 is a schematic diagram of the arrangement after renumbering the time-frequency resources of the random access channels in accordance with the seventh embodiment of the present document;

PREFERRED EMBODIMENTS

Figure 1:
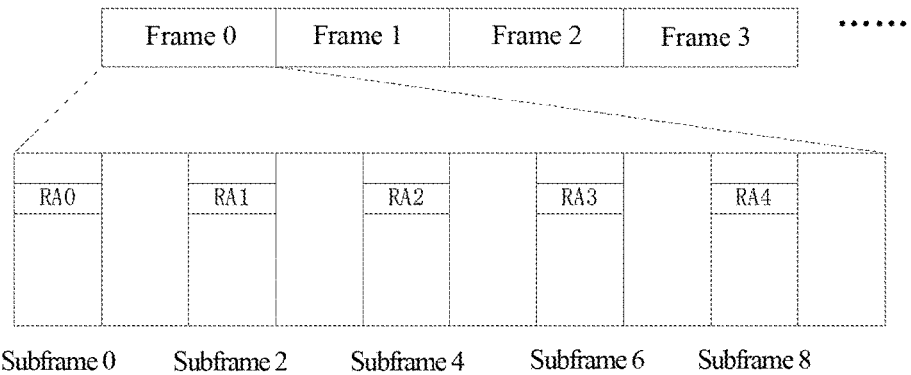
FIG. 1 is a schematic diagram of a time-frequency resource allocation of random access channels in accordance with the first, second and third embodiments of the present document.

Because an improvement design is performed on the Physical Random Access Channel (referred to as PRACH) in the LTE/LTE-A system to ensure that the MTC UE can normally access to the system, an improvement design also needs to be performed on the random access response message (RAR) in the LTE/LTE-A system to ensure that the MTC UE can normally receive.

To solve the abovementioned problem, the embodiment of the present document provides a method and system for allocating random access channel resources. Hereinafter in conjunction with the accompanying drawings, embodiments of the present document will be described in detail. It should be noted that, in the case of no conflict, embodiments and features in the embodiments of the present application may be arbitrarily combined with each other.

First Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:

one or more terminals, one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the Coverage Improvement Target (CIT) corresponding to each CIL is the same, and it is 5 dB in the present embodiment.

TABLE 1

| coverage improvement level configuration information | |
|---|---|
| CIL Index | Coverage Improvement Target (CIT) |
| 0 | 0 dB < CIV <= 5 dB |
| 1 | 5 dB < CIV <= 10 dB |
| 2 | 10 dB < CIV <= 15 dB |

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as a mapping table of the measurement results and the coverage improvement levels preconfigured by the eNB.

Wherein, the measurement result may be at least one of the following:

Reference Signal Receive Power (RSRP);
Reference Signal Receive Quality (RSRQ);
Received Signal Strength Indicator (RSSI);
path loss between the UE and the eNB;
received signal to noise ratio (SNR) of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

TABLE 2

Mapping relationship between RSRP measurement values and coverage improvement levels

| RSRP value range | CIL Index |
|---|---|
| $RSRP_{min}^{CIL0} < RSRP_{measure} \leq RSRP_{max}^{CIL0}$ | 0 |
| $RSRP_{min}^{CIL1} < RSRP_{measure} \leq RSRP_{max}^{CIL1}$ | 1 |
| $RSRP_{min}^{CIL2} < RSRP_{measure} \leq RSRP_{max}^{CIL2}$ | 2 |

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame and the same six PRB resources are occupied in the frequency domain, at most one set of PRACH resources is configured in each subframe, as shown in FIG. 1, wherein the RA is the six PRBs occupied by the PRACH time-frequency resources.

In the present embodiment, the CDM mode is used to allocate the PRACH resources to each CIL, that is, each CIL is allocated with the same PRACH time-frequency resources but a different preamble index. The preamble set allocated to each CIL may be obtained in accordance with the following scheme:

the eNB configures the total number of preamble sequences, such as 30, that can be used by the C MTC UE in the SIB, the starting preamble index is Index 31, the Preamble indexes available for the CI MTC UE are Index31~Index60, and with the standard, it is to predefine that the number of preamble sequences configured for each CIL is the same, then the preamble indexes available for the CIL0 are Index31~Index40, the preamble indexes available for the CIL1 are Index31~Index50, and the Preamble indexes available for the CIL2 are Index51~Index60.

The UE1 randomly selects one of the preambles whose indexes are Index31~Index40 to send;

TABLE 3

A mapping relationship of the coverage improvement level and the number of random access sequence retransmissions

| CIL Index | The number of random access sequence transmissions |
|---|---|
| 0 | $N_{CIL0}^{preamble}$ |
| 1 | $N_{CIL1}^{preamble}$ |
| 2 | $N_{CIL2}^{preamble}$ |

The UE1 determines that the number of random access sequence retransmissions is $N_{CIL0}^{preamble}$ according to Table 3. In the present embodiment, $N_{CIL0}^{preamble}=2$.

Figure 2:
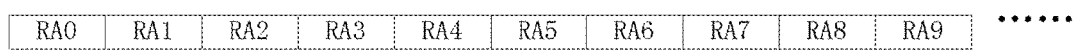
FIG. 2 is a schematic diagram of an arrangement after renumbering the time-frequency resources of the random access channels in accordance with the first embodiment of the present document.

The RA resources are renumbered as RA0, RA1, RA2, . . . , RA9, . . . , as shown in FIG. 2, and the UE1 can send the Preamble by taking RA0, RA2, RA4, . . . as the starting resource positions;

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1;

besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH;

besides of the present embodiment, the number of repetitions of the RRC layer connection request message of the UE1 may also be indicated in the random access response message of the UE1;

besides of the present embodiment, the number of repetitions of the contention resolution message of the UE1 can also be indicated in the random access response message of the UE1 or the RRC layer connection request message of the UE1;

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Second Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, and the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that needs to be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as a mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal;
with the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame and the same six PRB resources are occupied in the frequency domain, at most one set of PRACH resources is configured in each subframe, as shown in FIG. 1, wherein the RA is the six PRBs occupied by the PRACH time-frequency resources.

Figure 3:
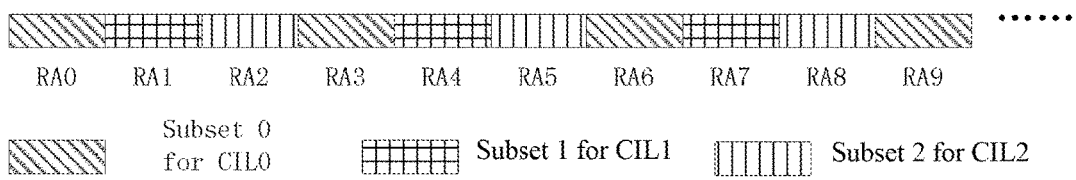
FIG. 3 is a schematic diagram of a time-frequency resource allocation result of random access channels of each coverage improvement level in accordance with the second embodiment of the present document.

In the present embodiment, the TDM mode is used to allocate the PRACH resources to each CIL, and the RA resources are renumbered as RA0, RA1, RA2, . . . , RA9, . . . , as shown in FIG. 3, RA0, RA3, RA6, RA9, . . . are configured as resources of the CIL0, RA1, RA4, RA7, . . . are configured as resources of the CIL1, and RA2, RA5, RA8, . . . are configured as resources of the CIL2.

The UE1 determines that the number of random access sequence retransmissions is $N_{CIL0}^{preamble}$ according to Table 3. In the present embodiment, $N_{CIL0}^{preamble}=2$.

The UE1 can send the Preamble by taking RA0, RA6, RA12, . . . as the starting resource positions;
in the present embodiment, after the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Third Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as a mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame and the same six PRB resources are occupied in the frequency domain, at most one set of PRACH resources is configured in each subframe, as shown in FIG. 1, wherein the RA is the six PRBs occupied by the PRACH time-frequency resources.

Figure 4:
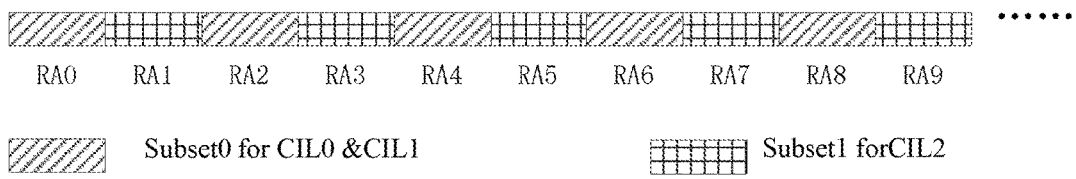
FIG. 4 is a schematic diagram of a time-frequency resource allocation result of random access channels of each coverage improvement level in accordance with the third embodiment of the present document.

In the present embodiment, the TDM mode is used to allocate the PRACH resources to each CIL, and the RA resources are renumbered as RA0, RA1, RA2, . . . , RA9, . . . , as shown in FIG. 4, RA0, RA2, RA4, RA6, . . . are configured as resources of the CIL0 and the CIL1, RA1, RA3, RA5, . . . are configured as resources of the CIL2. The CDM mode is used to allocate the PRACH resources to the CIL0 and the CIL1, that is, different preamble sequences are allocated to the CIL0 and the CIL1.

The preamble set allocated to each CIL can be obtained in accordance with the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for the CIL and the CIL1 is the same, then the preamble indexes available for the CIL0 are Index31~Index45, the preamble indexes available for the CIL1 are Index46~Index60, and the UE1 randomly selects one of the preambles whose indexes are Index31~Index45 to send.

The UE1 determines that the number of random access sequence retransmissions is $N_{CIL0}^{preamble}$ according to Table 3. In the present embodiment, $N_{CIL0}^{preamble}=2$.

The UE1 can send the Preamble by taking RA0, RA4, RA8, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 may also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Fourth Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, and the mapping table of the measurement results and the coverage improvement levels preconfigured by the eNB.

Wherein, the measurement result may be at least one of the following:

Reference Signal Receive Power (RSRP);
Reference Signal Receive Quality (RSRQ);
Received Signal Strength Indicator (RSSI);
path loss between the UE and the eNB;
received SNR of the downlink reference signal;

with the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

Figure 5:
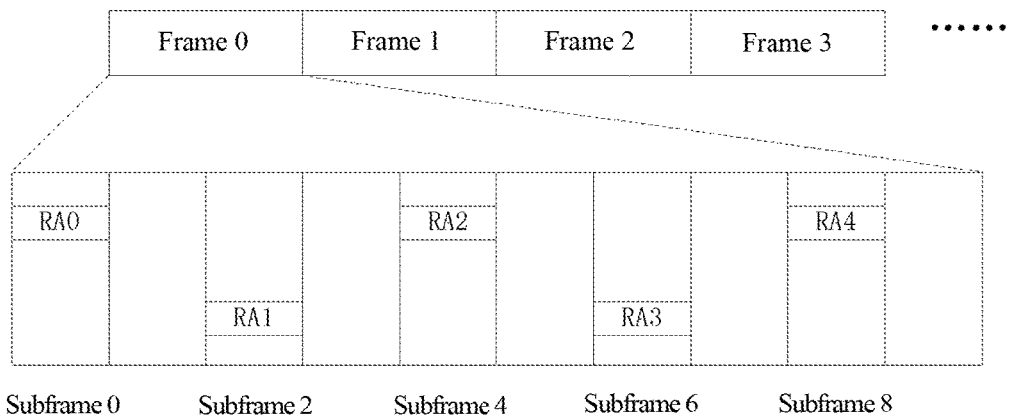
FIG. 5 is a schematic diagram of the time-frequency resource allocation of the random access channels in accordance with the fourth, fifth, sixth and seventh embodiments of the present document.

In the present embodiment, five sets of PRACH time-frequency resources are allocated in each Frame and different six PRB resources are occupied in the frequency domain, and at most one set of PRACH resources is configured in each subframe, as shown in FIG. 5, wherein the RA is the six PRBs occupied by the PRACH time-frequency resources;

in the present embodiment, the CDM mode is used to allocate the PRACH resources to each CIL, that is, each CIL is allocated with the same PRACH time-frequency resources but a different preamble index. The preamble set allocated to each CIL may be obtained in accordance with the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for each CIL is the same, and the preamble indexes available for the CIL0 are Index31~Index40, the preamble indexes available for the CIL1 are Index31~Index50, and the preamble indexes available for the CIL2 are Index51~Index60.

The UE1 randomly selects one of the Preambles whose indexes are Index31~Index40 to send. The UE1 determines that the number of random access sequence retransmissions is $N_{CIL0}^{preamble}$ according to Table 3. In the present embodiment, $N_{CIL0}^{preamble}=2$.

The RA resources are renumbered as RA0, RA1, RA2, . . . , RA9, . . . , as shown in FIG. 6, then the UE1 can send the Preamble by taking RA0, RA2, RA4, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1;

besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH;

besides of the present embodiment, the number of repetitions of the RRC layer connection request message of the UE1 may also be indicated in the random access response message of the UE1;

besides of the present embodiment, the number of repetitions of the contention resolution message of the UE1 can also be indicated in the random access response message of the UE1 or the RRC layer connection request message of the UE1;

in the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Fifth Specific Embodiment

The embodiment of the present document provides a method for allocating random access channel resources, wherein the first node sends the random access channel configuration information through the downlink channel, and the information at least includes configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, and the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal;
with the measurement result, the RSRP is selected, the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame and different six PRB resources are occupied in the frequency domain, at most one set of PRACH resources is configured in each subframe, as shown in FIG. 5, wherein the RA is the six PRBs occupied by the PRACH time-frequency resources.

In the present embodiment, the TDM mode is used to allocate the PRACH resources to each CIL, and the RA resources are renumbered as RA0, RA1, RA2, . . . , RA9, . . . , as shown in FIG. 7, RA0, RA3, RA6, RA9, . . . are configured as resources of the CIL0, RA1, RA4, RA7, . . . are configured as resources of the CIL1, and RA2, RA5, RA8, . . . are configured as resources of the CIL2.

The UE1 determines that the number of random access sequence retransmissions is $N_{CIL0}^{preamble}$ according to Table 3. In the present embodiment, $N_{CIL0}^{preamble}=2$.

The UE1 can send the Preamble by taking RA0, RA6, RA12, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1;

besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH;

besides of the present embodiment, the number of repetitions of the RRC layer connection request message of the UE1 may also be indicated in the random access response message of the UE1;

besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Sixth Specific Embodiment

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:

Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein, $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame, different six PRB resources are occupied in the frequency domain, and at most one set of PRACH resources is configured in each subframe, as shown in FIG. 5, wherein the RA is the six PRBs occupied by the PRACH time-frequency resources;

in the present embodiment, the TDM mode is used to allocate the PRACH resources to each CIL, and the RA resources are renumbered as RA0, RA1, RA2, . . . , RA9, . . . , as shown in FIG. 8, RA0, RA1, RA6, RA7, . . . are configured as resources of CIL0, RA2, RA3, RA8, RA9, . . . are configured as resources of CIL1, and RA4, RA5, RA10, RA11, . . . are configured as resources of CIL2.

The UE1 determines that the number of random access sequence retransmissions is $N_{CIL0}^{preamble}$ according to Table 3. In the present embodiment, $N_{CIL0}^{preamble}=2$.

The UE1 can send the Preamble by taking RA0, RA6, RA12, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1 the information of the number of repetitions of the PDCCH indicating the contention resolution message(ContentionResolution) of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Seventh Specific Embodiment

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:

Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, five sets of PRACH time-frequency resources are allocated in each Frame and the same six PRB resources are occupied in the frequency domain, and at most one set of PRACH resources is configured in each subframe, as shown in FIG. 5, wherein the RA is the six PRBs occupied by the PRACH time-frequency resources.

In the present embodiment, the TDM mode is used to allocate the PRACH resources to each CIL, and the RA resources are renumbered as RA0, RA1, RA2, . . . , RA9, . . . , as shown in FIG. 9, RA0, RA1, RA4, RA5, . . . are configured as resources of the CIL0 and the CIL1, RA2, RA3, RA6, RA7, . . . are configured as resources of the CIL2. The CDM mode is used to allocate the PRACH resources to the CIL0 and the CIL1, that is, allocate different preamble sequences to the CIL0 and the CIL1. The preamble set allocated to each CIL can be obtained according to the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the numbers of preamble sequences configured for the CIL and the CIL1 are the same, then the preamble indexes available for the CIL0 are Index31~Index45, and the preamble indexes available for the CIL1 are Index46~Index60.

The UE1 randomly selects one of the Preambles whose indexes are index31~index45 to send.

The UE1 determines that the number of random access sequence retransmissions is $N_{CIL0}^{preamble}$ according to Table 3. In the present embodiment, $N_{CIL0}^{preamble}=2$.

The UE1 can send the Preamble by taking RA0, RA4, RA8, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1 the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Eighth Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);

Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

Figure 10:
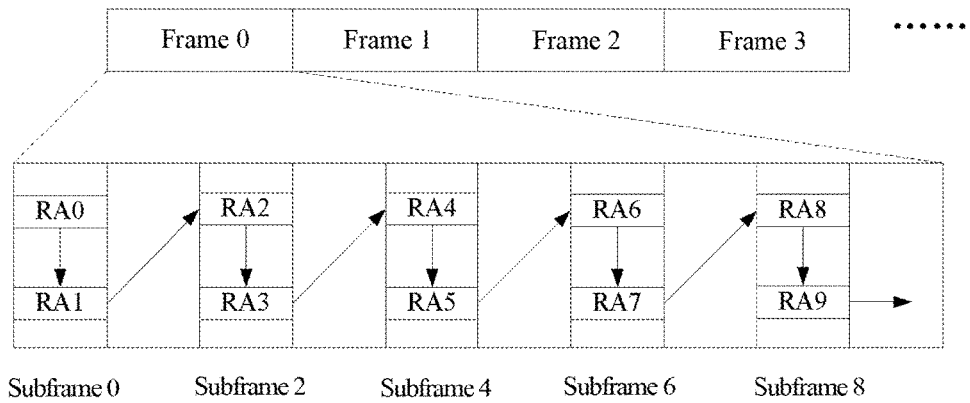
FIG. 10 is a schematic diagram of the time-frequency resource allocation of the random access channels in the eighth, ninth and tenth embodiments of the present document.

In the present embodiment, ten sets of PRACH time-frequency resources are allocated in each Frame, and at most two sets of PRACH resources are configured in each subframe, as shown in FIG. 10, wherein the RA is the six PRBs occupied by the PRACH time-frequency resources.

In the present embodiment, the CDM mode is used to allocate the PRACH resources to each CIL, that is, allocate the same PRACH time-frequency resources but a different preamble index to each CIL. The preamble set allocated to each CIL can be obtained according to the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for each CIL is the same, then the preamble indexes available for the CIL0 are Index31~Index40, the preamble indexes available for the CIL1 are Index31~Index50, and the preamble indexes available for the CIL2 are Index51~Index60.

The UE1 randomly selects one of the Preambles whose indexes are index31~index40 to send.

The UE1 determines that the number of random access sequence retransmissions is $N_{CIL0}^{preamble}$ according to Table 3. In the present embodiment, $N_{CIL0}^{preamble}=2$.

The RA resources are renumbered as RA0, RA1, RA2, . . . , RA9, . . . , and the UE1 can send the Preamble by taking RA0, RA1, RA4, RA5, . . . , as the starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 may also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Ninth Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, ten sets of PRACH time-frequency resources are allocated in each Frame, and at most two sets of PRACH resources are configured in each subframe, as shown in FIG. 10, wherein the RA is the six PRBs occupied by the PRACH time-frequency resources.

The UE1 determines that the number of random access sequence retransmissions is $N_{CIL0}^{preamble}$ according to Table 3. In the present embodiment, $N_{CIL0}^{preamble}=2$.

Figure 12:
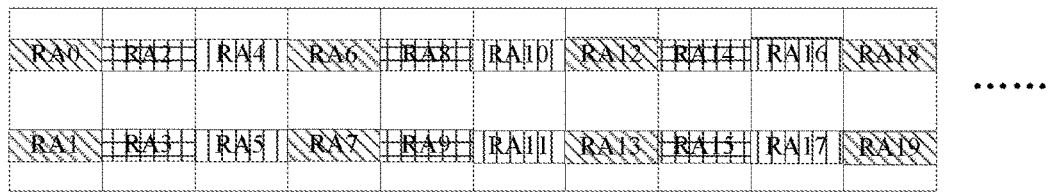
FIG. 12 is a schematic diagram of the time-frequency resource allocation result of the random access channels of each coverage improvement level in accordance with the ninth embodiment of the present document.

In the present embodiment, the TDM mode is used to allocate the PRACH resources to each CIL, and the RA resources are renumbered as RA0, RA1, RA2, RA3, . . . , as shown in FIG. 12, RA0, RA1, RA6, RA7, . . . are resources allocated to the CIL0; RA2, RA3, RA8, RA9, . . . are resources allocated to the CIL1; RA4, RA5, RA10, RA11, . . . are resources allocated to the CIL2.

In the present embodiment, the UE1 can send the Preamble by taking RA0, RA12, RA24, . . . as starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1 the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Tenth Specific Embodiment

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, ten sets of PRACH time-frequency resources are allocated in each Frame, and at most two sets of PRACH resources are configured in each subframe, as shown in FIG. 10, wherein the RA is the six PRBs occupied by the PRACH time-frequency resources.

The UE1 determines that the number of random access sequence retransmissions is $N_{CIL0}^{preamble}$ according to Table 3. In the present embodiment, $N_{CIL0}^{preamble}=2$.

Figure 13:
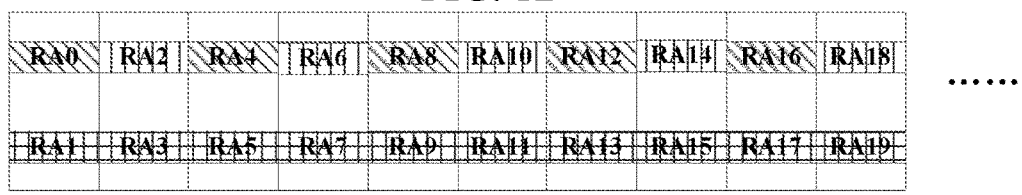
FIG. 13 is a schematic diagram of the time-frequency resource allocation result of the random access channels of each coverage improvement level in accordance with the tenth embodiment of the present document.

In the present embodiment, the FDM mode and the TDM mode are used to allocate the PRACH resources to each CIL, and the RA resources are renumbered as RA0, RA1, RA2, RA3, . . . , as shown in FIG. 13, RA1, RA3, RA5, RA7, . . . are PRACH time-frequency resources allocated to the CIL2; RA0, RA2, RA4, RA6, . . . are PRACH time-frequency resources allocated to the CIL0 and the CIL1. Furthermore, RA0, RA4, RA8, . . . are PRACH time-frequency resources allocated to the CIL0; and RA2, RA6, RA10, . . . are PRACH time-frequency resources allocated to the CIL1.

In the present embodiment, the UE1 can send the Preamble by taking RA0, RA8, RA16, . . . as starting resource positions.

In the present embodiment, when the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Eleventh Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:
one or more terminals,
one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

Figure 14:
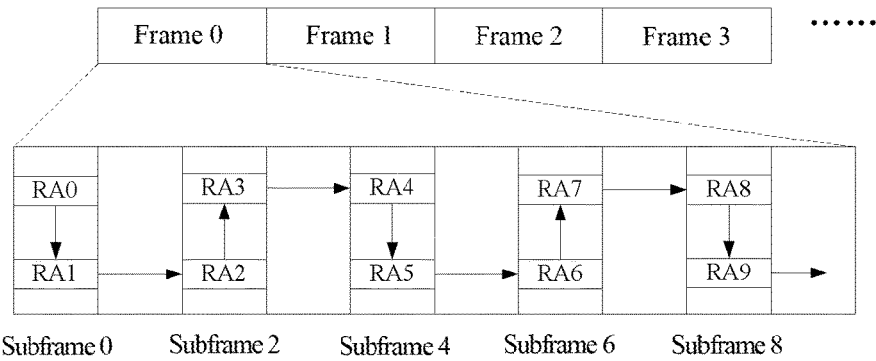
FIG. 14 is a schematic diagram of the time-frequency resource allocation of the random access channel in accordance with the eleventh embodiment of the present document.

In the present embodiment, ten sets of PRACH time-frequency resources are allocated in each Frame, and at most two sets of PRACH resources are configured in each subframe, as shown in FIG. 14, wherein the RA is the six PRBs occupied by the PRACH time-frequency resources.

In the present embodiment, the CDM mode is used to allocate the PRACH resources to each CIL, that is, allocate the same PRACH time-frequency resources but a different preamble index to each CIL. The preamble set allocated to each CIL can be obtained according to the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for each CIL is the same, then the preamble indexes available for the CIL0 are Index31~Index40, the preamble indexes available for the CIL1 are Index31~Index50, and the preamble indexes available for the CIL2 are Index51~Index60.

The UE1 randomly selects one of the Preambles whose indexes are index31~index40 to send.

The UE1 determines that the number of random access sequence retransmissions is $N_{CIL0}^{preamble}$ according to Table 3. In the present embodiment, $N_{CIL0}^{preamble}=2$.

Figure 15:
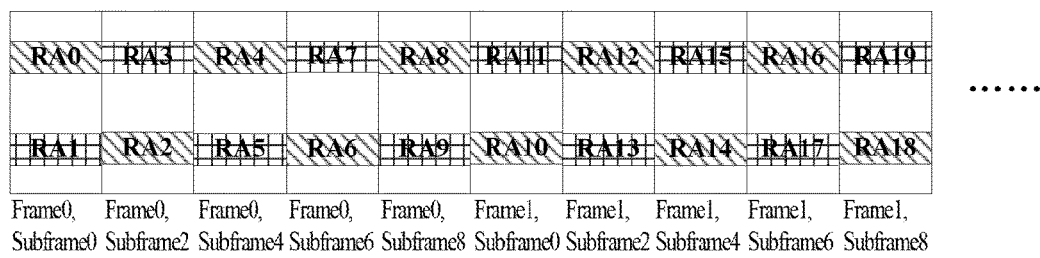
FIG. 15 is a schematic diagram of the time-frequency resource allocation result of the random access channels of each coverage improvement level in accordance with the eleventh embodiment of the present document.

The RA resources are renumbered as RA0, RA1, RA2, . . . , RA9, . . . , as shown in FIG. 15, then the first frequency hopping pattern is RA0, RA2, RA4, . . . ; the second frequency hopping pattern is RA1, RA3, RA5, . . . ; the UE1 can randomly select one frequency hopping pattern to use, for example, the UE1 selects the frequency hopping pattern 1, and the UE1 sends the Preamble by taking RA0, RA4, RA8, . . . as starting resource positions.

In the present embodiment, after the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1 the information of the number of repetitions of the PDCCH indicating the contention resolution message(ContentionResolution) of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Twelfth Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:

one or more terminals, one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:

Reference Signal Receive Power (RSRP);

Reference Signal Receive Quality (RSRQ);

Received Signal Strength Indicator (RSSI);

path loss between the UE and the eNB;

received SNR of the downlink reference signal.

With the measurement result, the RSRP is selected, and the mapping table of the RSRPs and the coverage improvement levels preconfigured by the eNB is shown in Table 2, wherein $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

Figure 16:
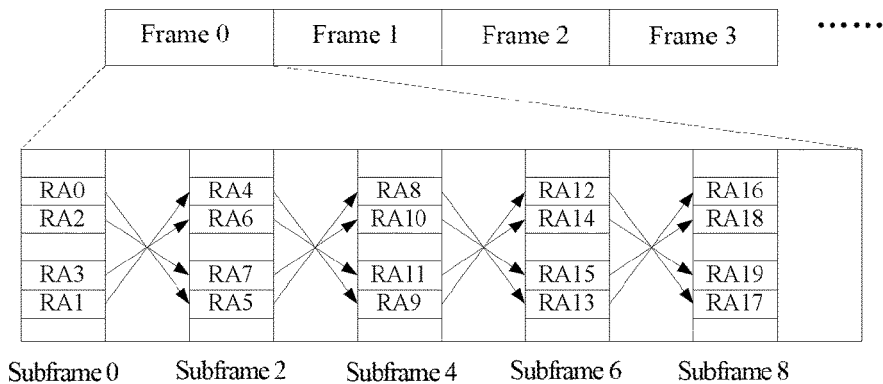
FIG. 16 is a schematic diagram of the time-frequency resource allocation result of the random access channels of each coverage improvement level in accordance with the twelfth embodiment of the present document.

In the present embodiment, ten sets of PRACH time-frequency resources are allocated in each Frame, and at most four sets of PRACH resources are configured in each subframe, as shown in FIG. 16, wherein the RA is the six PRBs occupied by the PRACH time-frequency resources.

In the present embodiment, the CDM mode is used to allocate the PRACH resources to each CIL, that is, allocate the same PRACH time-frequency resources but a different preamble index to each CIL. The preamble set allocated to each CIL can be obtained according to the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for each CIL is the same, the preamble indexes available for the CIL0 are Index31~Index40, the preamble indexes available for the CIL1 are Index31~Index50, and the preamble indexes available for the CIL2 are Index51~Index60.

The UE1 randomly selects one of the Preambles whose indexes are index31~index40 to send.

The UE1 determines that the number of random access sequence retransmissions is $N_{CIL0}^{preamble}$ according to Table 3. In the present embodiment $N_{CIL0}^{preamble}=2$.

The RA resources are renumbered as RA0, RA1, RA2, ..., RA9, ..., as shown in FIG. 16, then the first frequency hopping pattern is RA0, RA5, RA8, RA13, RA16, ...; the second frequency hopping pattern is RA1, RA4, RA9, RA12, RA17, ...; the third frequency hopping pattern is RA2, RA7, RA10, RA15, RA18, ...; the first frequency hopping pattern is RA3, RA6, RA11, RA14, RA19, ....

The UE1 can randomly select one frequency hopping pattern to use, for example, the UE1 selects the frequency hopping pattern 1, and the UE1 sends the Preamble by taking RA0, RA8, RA16, ... as starting resource positions.

In the present embodiment, after the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Thirteenth Specific Embodiment

The embodiment of the present document provides a method for allocating random access channel resources, wherein the first node sends the random access channel configuration information through the downlink channel, and the information includes at least configuration information of the random access channel allocated to the second node. The first node is at least one of the following:

Macrocell, Microcell, Picocell, Femtocell, low power node (LPN) and Relay.

The second node is at least one of the following:

one or more terminals, one or more terminal groups.

The embodiment of the present document takes the first node being an eNB and the second node being an MTC UE as an example to illustrate. It should be noted that, when the first node or the second node is another device listed above, the application scenario is also applicable to the embodiment of the present document, the implementation principles are the same and should be within the protection scope of the embodiments of the present document.

There are MTC UEs existing in the LTE system, and the MTC UEs are divided as Normal MTC UEs and Coverage Improvement MTC UEs (CI MTC UE). Three Coverage Improvement Levels (CILs) are configured in the system, as shown in Table 1, the value range of the coverage improvement target (CIT) corresponding to each CIL is the same, and it is 5 dB in the present embodiment.

According to the position of the coverage improvement target value that should be supported by the CI MTC UE in the value range in Table 1, the CI MTC UEs are divided into three coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:

Reference Signal Receive Power (RSRP);

Reference Signal Receive Quality (RSRQ);

Received Signal Strength Indicator (RSSI);

path loss between the UE and the eNB;

received SNR of the downlink reference signal.

With the measurement result, the RSRP is selected, and the mapping table of the RSRPs and the coverage improvement levels preconfigured by the eNB is shown in Table 2, wherein, $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

Figure 17:
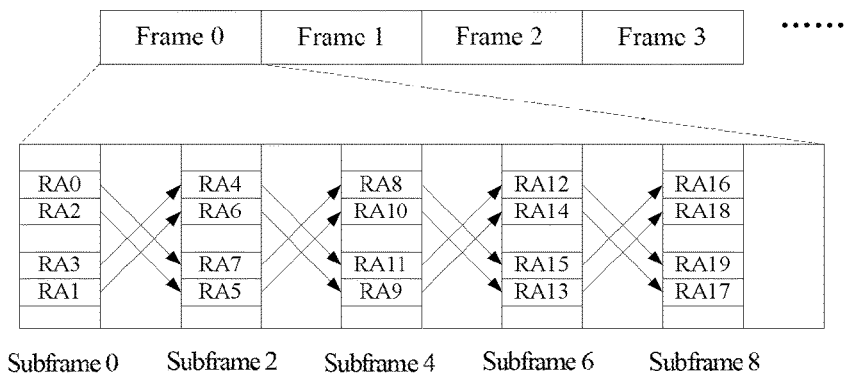
FIG. 17 is a schematic diagram of the time-frequency resource allocation result of the random access channels of each coverage improvement level in accordance with the thirteenth embodiment of the present document.

In the present embodiment, ten sets of PRACH time-frequency resources are allocated in each Frame, and at most four sets of PRACH resources are configured in each subframe, as shown in FIG. 17, wherein the RA is the six PRBs occupied by the PRACH time-frequency resources.

In the present embodiment, the CDM mode is used to allocate the PRACH resources to each CIL, that is, allocate the same PRACH time-frequency resources but a different preamble index to each CIL. The preamble set allocated to each CIL can be obtained according to the following scheme:

the eNB configures the total number of preamble sequences, such as 30, that can be used by the CI MTC UE in the SIB, the starting preamble index is Index 31, the Preamble indexes available for the CI MTC UE are Index31~Index60, and with the standard, it is to predefine that the number of preamble sequences configured for each CIL is the same, then the preamble indexes available for the CIL0 are Index31~Index40, the preamble indexes available for the CIL1 are Index31~Index50, and the preamble indexes available for the CIL2 are Index51~Index60.

The UE1 randomly selects one of the Preambles whose indexes are index31~index40 to send.

The UE1 determines that the number of random access sequence retransmissions is $N_{CIL0}^{preamble}$ according to Table 3. In the present embodiment, $N_{CIL0}^{preamble}=2$.

The RA resources are renumbered as RA0, RA1, RA2, RA3, . . . , as shown in FIG. 16, then the first frequency hopping pattern is RA0, RA7, RA8, RA15, RA16, . . . ; the second frequency hopping pattern is RA1, RA6, RA9, RA14, RA17, . . . ; the third frequency hopping pattern is RA2, RA5, RA10, RA13, RA18, . . . ; the fourth frequency hopping pattern is RA3, RA4, RA11, RA12, RA19, . . . .

The UE1 can randomly select one frequency hopping pattern to use, for example, the UE1 selects the frequency hopping pattern 1, and the UE1 sends the Preamble by taking RA0, RA8, RA16, . . . as starting resource positions.

In the present embodiment, after the UE1 determine that its own CIL is CIL0, at least one of the following information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the contention resolution message(ContentionResolution) of the UE1;

the number of repetitions of the random access response message of the UE1;

the number of repetitions of the RRC layer connection request message of the UE1;

the number of repetitions of the contention resolution message of the UE1.

Besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH.

Besides of the present embodiment, the number of repetitions of the RRC layer connection request message of the UE1 may also be indicated in the random access response message of the UE1.

Besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Fourteenth Specific Embodiment

There are MTC UEs existing in the LTE system, and the MTC UEs are divided as Normal MTC UEs and Coverage Improvement MTC UEs (CI MTC UE). Two Coverage Improvement Levels (CILs) are configured in the system, as shown in Table 4, the value range of the coverage improvement target (CIT) corresponding to each CIL is the same, and it is 7.5 dB in the present embodiment.

TABLE 4

| Coverage improvement level configuration information | |
|---|---|
| CIL Index | Coverage Improvement Target(CIT) |
| 0 | 0 dB < CIV <= 7.5 dB |
| 1 | 7.5 dB < CIV <= 15 dB |

According to the position of the coverage improvement target value that should be supported by the CI MTC UE in the value range in Table 1, the CI MTC UEs are divided into two coverage improvement levels. For example, the UE measures the reference signal sent by the eNB, and determines the coverage improvement level selected by the UE at the first time based on the measurement result, as well as the mapping table of the measurement results and the coverage improvement levels preconfigured by the eNB.

Wherein, the measurement result may be at least one of the following:
Reference Signal Receive Power (RSRP);
Reference Signal Receive Quality (RSRQ);
Received Signal Strength Indicator (RSSI);
path loss between the UE and the eNB;
received SNR of the downlink reference signal;
with the measurement result, the RSRP is selected, and the mapping table of the RSRPs and the coverage improvement levels preconfigured by the eNB is shown in Table 5, wherein, $RSRP_{measure}$ is the RSRP measurement value, $RSRP_{min}^{CIL0}$ and $RSRP_{max}^{CIL0}$ are minimum and maximum values of the value range of CIL0; $RSRP_{min}^{CIL1}$ and $RSRP_{max}^{CIL1}$ minimum and maximum values of the value range of CIL1; $RSRP_{min}^{CIL2}$ and $RSRP_{max}^{CIL2}$ are minimum and maximum values of the value range of CIL2. $RSRP_{min}^{CIL0}$, $RSRP_{max}^{CIL0}$, $RSRP_{min}^{CIL1}$, $RSRP_{max}^{CIL1}$, $RSRP_{min}^{CIL2}$ and $RSRP_{max}^{CIL2}$ are predefined by the standard or sent by the eNB through the downlink channel to the UE.

TABLE 5

Mapping relationship of the RSRP measurement values and the coverage improvement levels

| RSRP value range | CIL Index |
|---|---|
| $RSRP_{min}^{CIL0} < RSRP_{measure} \leq RSRP_{max}^{CIL0}$ | 0 |
| $RSRP_{min}^{CIL1} < RSRP_{measure} \leq RSRP_{max}^{CIL1}$ | 1 |

In the present embodiment, the UE1 determines that its own CIL is CIL0 by measuring the RSRP in accordance with the abovementioned rules.

In the present embodiment, the eNB configures the random access sequence sending format (preamble format) as format 0, which occupies one subframe in the time domain, and six PRBs in the frequency domain.

In the present embodiment, ten sets of PRACH time-frequency resources are allocated in each Frame, and at most six sets of PRACH resources are configured in each subframe, as shown in FIG. 10, wherein the RA is the six PRBs occupied by the PRACH time-frequency resources.

TABLE 6

Mapping relationship between the coverage improvement levels and the numbers of random access sequence retransmissions

| CIL Index | The number of random access sequence retransmissions |
|---|---|
| 0 | $N_{CIL0}^{preamble}$ |
| 1 | $N_{CIL1}^{preamble}$ |

The UE1 determines that the number of random access sequence retransmissions is $N_{CIL0}^{preamble}$ according to Table 6. In the present embodiment, $N_{CIL0}^{preamble}=2$.

Figure 11:
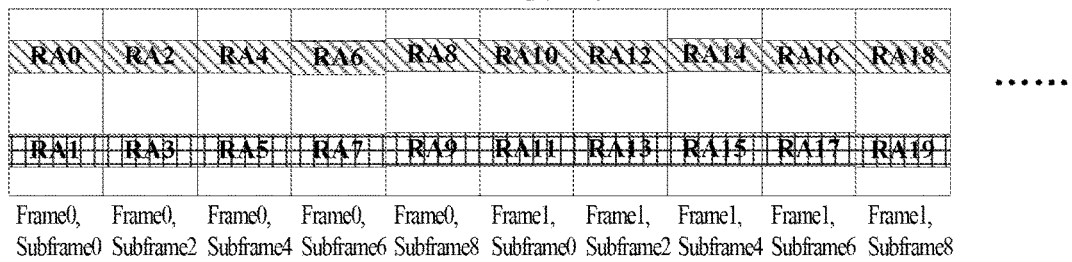
FIG. 11 is a schematic diagram of a time-frequency resource allocation result of the random access channels of each coverage improvement level in accordance with the fourteenth embodiment of the present document.

In the present embodiment, the FDM mode is used to allocate the PRACH resources to each CIL, and the RA resources are renumbered as RA0, RA1, RA2, RA3, . . . , as shown in FIG. 11, RA0, RA2, RA4, RA6, . . . are PRACH time-frequency resources allocated to the CIL0; RA1, RA3, RA5, RA7, . . . are PRACH time-frequency resources allocated to the CIL1;

in the present embodiment, the UE1 can send the Preamble by taking RA0, RA4, RA8, . . . as starting resource positions;

in the present embodiment, after the UE1 determines that its own CIL is CIL0, at least one of the information of the number of retransmissions can be indicated by the CIL0 of the UE1:

the information of the number of repetitions of the PDCCH indicating the random access response message of the UE1;

the information of the number of repetitions of the PDCCH indicating the RRC layer connection request message (RRCConnectionRequest) of the UE1;

the information of the number of repetitions of the PDCCH indicating the ContentionResolution message of the UE1;

the number of repetitions of the random access response message of the UE1;

the number of repetitions of the RRC layer connection request message of the UE1;

the number of repetitions of the contention resolution message of the UE1;

besides of the present embodiment, the number of repetitions of the random access response message of the UE1 may also be indicated in the PDCCH; the number of repetitions of the RRC layer connection request message of the UE1 may also be indicated in the PDCCH; the number of repetitions of the contention resolution message of the UE1 may also be indicated in the PDCCH;

besides of the present embodiment, the number of repetitions of the RRC layer connection request message of the UE1 may also be indicated in the random access response message of the UE1;

besides of the present embodiment, the number of repetitions of the contention resolution message of the UE1 can also be indicated in the random access response message of the UE1 or the RRC layer connection request message of the UE1.

In the present embodiment, after the UE1 accesses to the system, the number of initial repetitions of the PDCCH of the UE1 is indicated by the coverage improvement level CIL0 of the UE1, or is the same as the number of repetitions of the PDCCH indicating the random access response message of the UE1; or is the same as the number of repetitions of the PDCCH indicating the contention resolution message of the UE1.

Fifteenth Specific Embodiment

The embodiment of the present document provides a system for allocating random access channel resources, including a first node and a second node;

the first node is used to send random access channel configuration information through a downlink channel, wherein the information includes at least information of the random access channel allocated to the second node.

The first node is at least one of the following:

Macrocell, Microcell, Picocell, Femtocell, low power node (LPN) and Relay.

The second node is at least one of the following:

one or more terminals, one or more terminal groups.

The system for allocating random access channel resources provided in the embodiment of the present document can be combined with the method for allocating random access channel resources provided in the embodiment of the present document.

Those ordinarily skilled in the art can understand that all or some of the steps of the abovementioned embodiments may be implemented by using a computer program process, and the computer program may be stored in a computer-readable storage medium and executed on an appropriate hardware platform (such as a system, equipment, device, component, and so on), and during the execution, it includes one or a combination of the steps of the method embodiment.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combinations of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art within the technical scope disclosed in the present document can easily think of changes or replacements that shall fall within the protection scope of the present document. Therefore, the protection scope of the present document should be the protection scope of the claims.

INDUSTRIAL APPLICABILITY

The embodiment of the present document provides a method and system for allocating random access channel resources, and the first node sends random access channel configuration information through a downlink channel, the random access channel configuration information includes at least random access channel resource information allocated to a third node, the random access channel configuration information is configured by the system or configured by the first node in the SI or the DCI, to achieve a random access response message receiving configuration in an improvement design, and to solve the problem of an MTC UE receiving a random access response message.

What is claimed is:

1. A method for allocating random access channel resources, comprising:
    a first node sending random access channel configuration information through a downlink channel, wherein the information comprises at least configuration information of a random access channel allocated to a second node;
    wherein the method further comprises: dividing second nodes into one or more sets based on different coverage improvement targets that need to be supported, one second node in each set corresponds to one coverage improvement level;
    wherein a value range of a coverage improvement target corresponding to each coverage improvement level is determined by a number of coverage improvement levels and a maximum value of the coverage improvements and in accordance with a predefined rule; or,
    the value range of the coverage improvement target corresponding to each coverage improvement level is determined by the number of coverage improvement levels, the maximum value of the coverage improvements and a minimum value of the coverage improvements and in accordance with the predefined rule;
    wherein the predefined rule is any of the following:
    the value range of the coverage improvement target corresponding to each coverage improvement level is equal and has no overlapping, and value ranges of all coverage improvement targets which are put together are the same as a range from the minimum value of coverage improvement targets to the maximum value of coverage improvement targets;
    the value range of the coverage improvement target corresponding to each coverage improvement level is equal and has no overlapping, and value ranges of all coverage improvement targets which are put together are less than the range from the minimum value of coverage improvement targets to the maximum value of coverage improvement targets;
    the value range of the coverage improvement target corresponding to each coverage improvement level has no overlapping, and a proportional relationship of a length of a value range of the coverage improvement target corresponding to each coverage improvement level is configured by a system or sent by the first node through the downlink channel to the second node, the value ranges of all the coverage improvement targets which are put together are the same as the range from the minimum value of coverage improvement targets to the maximum value of coverage improvement targets,
    the value range of the coverage improvement target corresponding to each coverage improvement level has no overlapping, the proportional relationship of the length of the value range of the coverage improvement target corresponding to each coverage improvement level is configured by the system or sent by the first node through the downlink channel to the second node, and the value ranges of all the coverage improvement targets which are put together are less than the value range from the minimum value of coverage improvement targets to the maximum value of coverage improvement targets.

2. The method for allocating random access channel resources of claim 1, wherein, the random access channel configuration information is configured by the system, or configured by the first node in System Information (SI) or downlink control information (DCI).

3. The method for allocating random access channel resources of claim 1, wherein, the method further comprises: the system configuring or the first node sending a number N of coverage improvement levels through the downlink channel to the second node.

4. The method for allocating random access channel resources of claim 3, wherein, the coverage improvement level corresponds to the value range of one coverage improvement target.

5. The method for allocating random access channel resources of claim 1, wherein, the maximum value of the coverage improvement target is configured by the system or sent by the first node through the downlink channel to the second node
    or,
    wherein, the minimum value of the coverage improvement target is configured by the system or sent by the first node through the downlink channel to the second node.

6. The method for allocating random access channel resources of claim 1, wherein, the method further comprises: configuring each coverage improvement level with a random access sequence, wherein, a proportion of a number of the configured random access sequences comprises one or more proportional relationships, and wherein, the proportional relationship is configured by the system or sent by the first node through the downlink channel to the second node.

7. The method for allocating random access channel resources of claim 1, wherein, the method further comprises:

through a coverage improvement level of the second node, indicating a number of retransmissions or a retransmission level of at least one of the following information:
  physical downlink control channel (PDCCH) indicating a random access response message of the second node;
  PDCCH indicating a radio resource control (RRC) layer connection request message (RRC Connection Request) of the second node;
  PDCCH indicating a content resolution message (Contention Resolution) of the second node;
  a random access response message of the second node;
  an RRC layer connection request message of the second node;
  a contention resolution message of the second node,
  and wherein, there exists a mapping relationship between the retransmission level of the information and the number of retransmissions of the information, and the number of retransmissions of the information is determined according to the retransmission level of the information.

8. The method for allocating random access channel resources of claim 1, wherein, time-frequency resources allocated to the random access channels of the second nodes of different coverage improvement levels are different.

9. The method for allocating random access channel resources of claim 8, wherein, the first node allocates different time-frequency resources to the random access channels of the second nodes of different coverage improvement levels through time division multiplexing (TDM) and/or frequency division multiplexing (FDM), and wherein, in a same period of time, when a plurality of sets of physical resource block (PRB) groups desired for sending random access sequences are configured in frequency domain resources, the first node can use the FDM to allocate different time-frequency resources to the random access channels of the second nodes of different coverage improvement levels,
  wherein, the time-frequency resources are at least one of the following: a PRB, a PRB set, a subframe, and a subframe set.

10. The method for allocating random access channel resources of claim 1, wherein, time-frequency resources allocated to the random access channels of the second nodes of a plurality of coverage improvement levels are the same.

11. The method for allocating random access channel resources of claim 10, wherein, random access sequences allocated to the second nodes of the plurality of coverage improvement levels are different, and wherein, in a same period of time, when a plurality of sets of physical resource block (PRB) groups desired for sending the random access sequences are configured in frequency domain resources, proportions of numbers of random access sequences allocated to the second nodes of each coverage improvement level in the plurality of coverage improvement levels are the same in each set of PRB group resources, or a proportional relationship of the numbers of random access sequences allocated to the second nodes of each coverage improvement level in the plurality of coverage improvement levels is configured by the system or sent by the first node through the downlink channel to the second node,
  wherein, the time-frequency resources are at least one of the following: a PRB, a PRB set, a subframe, and a subframe set.

12. The method for allocating random access channel resources of claim 1, wherein, a format used by the second node for sending random access sequences is configured by the system or sent by the first node through the downlink channel to the second node, and wherein, the method further comprises: the second node resending a random access sequence for M times according to the format, wherein a value of M is indicated by the coverage improvement level of the second node, wherein, the time-frequency resources of the random access channels occupied by the second node for resending the random access sequence for M times are determined according to the predefined rule, wherein the predefined rule is at least one of the following:
  indexes of PRBs or PRB groups corresponding to the time-frequency resources of the random access channels occupied by the random access sequence of M times are the same,
  indexes of PRBs or PRB groups corresponding to the time-frequency resources of the random access channels occupied by the random access sequence of M times are different,
  frequency-domain positions corresponding to the time-frequency resources of the random access channels occupied by the random access sequence of M times are the same,
  frequency-domain positions corresponding to the time-frequency resources of the random access channels occupied by the random access sequence of M times are different,
  when only one set of physical resource block (PRB) groups desired for sending the random access sequence is configured in the frequency domain resources in a same period of time, indexes of the PRBs occupied for sending the random access sequence for two successive times are different,
  when only one set of physical resource block (PRB) groups desired for sending the random access sequence is configured in the frequency domain resources in the same period of time, frequency positions of the PRBs occupied for sending the random access sequence for two successive times are different,
  when a plurality of sets of physical resource block (PRB) groups desired for sending the random access sequence is configured in the frequency domain resources in the same period of time, different sets of PRB group resources are occupied for sending the random access sequence for two successive times, and rules for selecting PRB resources occupied for sending the random access sequence for two successive times are configured by the system.

13. The method for allocating random access channel resources of claim 1, wherein, the method further comprises:
  when initially accessing to the system, the second node selecting the coverage improvement level at a first time in accordance with the following rules:
  the second node measuring a reference signal sent by the first node, and determining a coverage improvement level selected by the second node at the first time based on a measurement result and a mapping table of measurement results with the coverage improvement levels configured by the system, and wherein, the measurement result is at least one of the following:
  reference signal receive power (RSRP),
  reference signal receive quality (RSRQ),
  received signal strength indicator (RSSI),
  path loss between the second node and the first node, received signal to noise ratio (SNR) of a downlink reference signal, or, wherein, the method further comprises:

when initially accessing to the system, the second node selecting the minimum coverage improvement level configured by the system.

14. The method for allocating random access channel resources of claim 1, wherein, the random access channel information allocated to the second node further comprises starting resource position information for the second node sending a random access sequence in the allocated random access channel, and the starting resource position information is at least one of the following:

information of a subframe where the starting resource is located, information of a frame where the starting resource is located, information of a physical resource block (PRB) where the starting resource is located, information of a physical resource block group (PRB group) where the starting resource is located, information of a subcarrier where the starting resource is located, or, wherein, the system configuring is specifically any one or more of the following:

predefining with a standard;

predefining with a network;

configuring with the standard;

configuring with the network;

configuring with a network high layer, or, wherein, the first node is at least one of the following:

Macrocell, Microcell, Picocell, Femtocell, low power node (LPN) and Relay.

15. The method for allocating random access channel resources of claim 1, wherein, the second node is at least one of the following:

one or more terminals;

one or more terminal groups, and wherein, the terminal is a machine type communication (MTC) terminal and/or an MTC coverage improvement terminal.

16. The method for allocating random access channel resources of claim 1, wherein, a number of repetitions of a random access response message of the second node is indicated in a physical downlink control channel (PDCCH), or, wherein, a number of repetitions of a radio resource control (RRC) layer connection request message of the second node is indicated in the PDCCH, or, wherein, information of the number of repetitions of the RRC layer connection request message of the second node is indicated in the random access response message of the second node, or, wherein, a number of repetitions of the contention resolution message of the second node is indicated in the PDCCH, or, wherein, information of the number of repetitions of the contention resolution message of the second node is indicated in the random access response message of the second node or indicated in the RRC layer connection request message of the second node, or, wherein, after the second node accesses to the system, a number of initial repetitions of the PDCCH of the second node is indicated by the coverage improvement level of the second node, or, the number of initial repetitions of the PDCCH of the second node is the same as the number of repetitions of the PDCCH indicating the random access response message of the second node, or, the number of initial repetitions of the PDCCH of the second node is the same as the number of repetitions of the PDCCH indicating the contention resolution message of the second node.

17. A system for allocating random access channel resources, comprising a first node and a second node; wherein, the first node is configured to: send random access channel configuration information through a downlink channel, and the information comprises at least random access channel information allocated to the second node;

wherein the first node is further configured to divide second nodes into one or more sets based on different coverage improvement targets that need to be supported, one second node in each set corresponds to one coverage improvement level;

wherein a value range of a coverage improvement target corresponding to each coverage improvement level is determined by a number of coverage improvement levels and a maximum value of the coverage improvements and in accordance with a predefined rule; or, the value range of the coverage improvement target corresponding to each coverage improvement level is determined by the number of coverage improvement levels, the maximum value of the coverage improvements and a minimum value of the coverage improvements and in accordance with the predefined rule;

wherein the predefined rule is any of the following:

the value range of the coverage improvement target corresponding to each coverage improvement level is equal and has no overlapping, and value ranges of all coverage improvement targets which are put together are the same as a range from the minimum value of coverage improvement targets to the maximum value of coverage improvement targets;

the value range of the coverage improvement target corresponding to each coverage improvement level is equal and has no overlapping, and value ranges of all coverage improvement targets which are put together are less than the range from the minimum value of coverage improvement targets to the maximum value of coverage improvement targets;

the value range of the coverage improvement target corresponding to each coverage improvement level has no overlapping, and a proportional relationship of a length of a value range of the coverage improvement target corresponding to each coverage improvement level is configured by the system or sent by the first node through the downlink channel to the second node, the value ranges of all the coverage improvement targets which are put together are the same as the range from the minimum value of coverage improvement targets to the maximum value of coverage improvement targets, the value range of the coverage improvement target corresponding to each coverage improvement level has no overlapping, the proportional relationship of the length of the value range of the coverage improvement target corresponding to each coverage improvement level is configured by the system or sent by the first node through the downlink channel to the second node, and the value ranges of all the coverage improvement targets which are put together are less than the value range from the minimum value of coverage improvement targets to the maximum value of coverage improvement targets.

* * * * *